(12) United States Patent
Segawa

(10) Patent No.: US 9,094,295 B2
(45) Date of Patent: Jul. 28, 2015

(54) COMMUNICATION DEVICE, AND WIRING STATE DETECTION METHOD AND NON-TRANSITORY COMPUTER-READABLE MEDIUM STORING PROGRAM USING COMMUNICATION DEVICE

(71) Applicant: Panasonic Intellectual Property Management Co., Ltd., Osaka-shi, Osaka (JP)

(72) Inventor: Mitsuru Segawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 180 days.

(21) Appl. No.: 13/856,445

(22) Filed: Apr. 4, 2013

(65) Prior Publication Data

US 2013/0265865 A1    Oct. 10, 2013

(30) Foreign Application Priority Data

Apr. 6, 2012   (JP) ................. 2012-087092
Mar. 26, 2013  (JP) ................. 2013-064910

(51) Int. Cl.
  *H04L 12/24* (2006.01)
  *H04L 12/40* (2006.01)
  *H04L 12/26* (2006.01)

(52) U.S. Cl.
  CPC ...... *H04L 41/0672* (2013.01); *H04L 12/40006* (2013.01); *H04L 12/40169* (2013.01); *H04L 41/0659* (2013.01); *H04L 43/0811* (2013.01); *H04L 12/26* (2013.01); *H04L 43/50* (2013.01); *H04L 2012/4028* (2013.01)

(58) Field of Classification Search
  None
  See application file for complete search history.

(56) References Cited

U.S. PATENT DOCUMENTS

| | | | | |
|---|---|---|---|---|
| 6,434,716 B1* | 8/2002 | Johnson et al. | ............... | 714/712 |
| 7,372,804 B2* | 5/2008 | Arikawa et al. | ............... | 370/217 |
| 8,089,907 B2* | 1/2012 | Pannell et al. | ................ | 370/282 |
| 8,295,163 B1* | 10/2012 | Schmalz et al. | .............. | 370/225 |
| 8,582,443 B1* | 11/2013 | Sun et al. | ....................... | 370/242 |
| 2002/0041571 A1* | 4/2002 | Huff | .............................. | 370/252 |
| 2005/0207360 A1* | 9/2005 | Costo et al. | ................... | 370/282 |
| 2006/0078093 A1* | 4/2006 | Karam et al. | ................... | 379/24 |
| 2007/0183349 A1* | 8/2007 | Pannell et al. | ................ | 370/276 |
| 2010/0067372 A1* | 3/2010 | Diab | ............................. | 370/228 |
| 2011/0069794 A1* | 3/2011 | Tavassoli Kilani et al. | .. | 375/346 |
| 2014/0022891 A1* | 1/2014 | Matityahu et al. | ............ | 370/225 |

FOREIGN PATENT DOCUMENTS

JP    2001-291564 A    10/2001

* cited by examiner

*Primary Examiner* — Chi H Pham
*Assistant Examiner* — Vladislav Agureyev
(74) *Attorney, Agent, or Firm* — Shinjyu Global IP

(57) ABSTRACT

The communication device, which is connectable by straight or crossover wiring to another communication device, comprises a transmission port configured to send signals to the other communication device, a reception port configured to receive signals, a communication controller including an automatic transmission and reception switching component that determines whether or not the wiring is correct and automatically switches the transmission and reception of signals by the transmission port and the reception port 1, and a wiring state notification component. The controller (i) actuates the automatic transmission and reception switching component when communication with the other communication device has not been established in a state in which the automatic transmission and reception switching component is not actuated, and (ii) through the wiring state notification component, outputs information that there is an error in the wiring when communication with the other communication device has been established as a result of (i).

9 Claims, 6 Drawing Sheets

COMMUNICATION DEVICE, AND WIRING STATE DETECTION METHOD AND NON-TRANSITORY COMPUTER-READABLE MEDIUM STORING PROGRAM USING COMMUNICATION DEVICE

CROSS-REFERENCE TO RELATED APPLICATIONS

This application claims priority to Japanese Patent Application No. 2012-087092 filed on Apr. 6, 2012 and Japanese Patent Application No. 2013-064910 filed on Mar. 26, 2013. The entire disclosures of Japanese Patent Application No. 2012-087092 and Japanese Patent Application No. 2013-064910 are hereby incorporated herein by reference.

BACKGROUND

1. Technical Field

This disclosure relates to a device and method for detecting the wiring state in a network.

2. Description of the Related Art

Onboard networks for entertainment systems used on aircraft are sometimes connected with a twisted pair cable. A twisted pair cable is called 10BASE-T or 100BASE-TX (hereinafter these two will be collectively referred to as 10/100BASE-TX), which have been standardized as a LAN standard by IEEE (Institute of Electrical and Electronics Engineers (US)) 802.3 as a transmission medium for connecting devices.

There are two kinds of 10/100BASE-TX cable: a straight cable and a crossover cable (see Japanese Laid-Open Patent Application 2001-291564, for example). However, the quality and reliability of communication device must be improved by eliminating as many uncertain elements as possible in wiring. In particular, in Ethernet® communication between devices, the devices are sometimes connected by straight or crossover cable by fixing the transmission and reception directions and disabling the automatic switching between MDI (medium dependent interface) and MDI-X (medium dependent interface crossover) and determining ahead of time the pin layout for transmission and reception in the devices. Also, depending on the communication method, two lines may be readied for a transmitter and a receiver since data communication performed in a single frequency band is limited to one direction, or the orientation of a single line may be periodically inverted. The former is called full-duplex communication (hereinafter referred to as full-duplex), while the latter is called half-duplex communication (hereinafter referred to as half-duplex).

Automatically determining whether the communication method will be full-duplex or half-duplex communication is the norm in consumer applications, but the method is sometimes predetermined in network wiring used in aircraft. Aircraft network wiring is rarely changed after the system has been installed, except for during major modifications such as major remodeling of the aircraft interior, so the signal layout between devices is also rarely changed.

In general, devices that are installed in an aircraft are subjected to different conditions from those of consumer devices, such as vibrations and temperature changes, electrical and magnetic disturbances during flight, and the need for materials to be flame retardant. Thus, the wiring material (harness) of the network is sometimes a dedicated harness that uses special cables that are resistant in a variety of situations, rather than the Ethernet® cables that are commonly used.

Aircraft come in many different combinations of seat configuration and type of fuselage, so these dedicated harnesses cannot be mass produced, and incorrect wiring or broken connections often occur due to human error. When a device is installed in an aircraft, a network is wired, and then the power is switched on for testing, problems can occur in which network communication does not work.

If this happens, whether the reason behind the problem is malfunction of the device or incorrect wiring is not immediately apparent, so both the device and the harness have to be checked, which takes a great deal of time. With general-purpose consumer devices and the like, a method has been adopted in which communication is established by utilizing an automatic MDI/MDI-X switching function when the straight/crossover connection of Ethernet® wiring is reversed between devices due to incorrect wiring.

However, as mentioned above, with network wiring used in an aircraft, there are many required specifications such as disabling auto-negotiation or the MDI/MDI-X switching of devices, and in such cases communication cannot be established. This makes it impossible to determine whether the cause is a device malfunction or incorrect wiring. Furthermore, since aircraft-use network wiring requires the production of a dedicated harness as mentioned above, other causes of disconnection frequently occur besides incorrect straight or crossover wiring, and in this case detection is impossible by the above method.

SUMMARY

In view of this, the present invention provides a method and device that are effective in the detection of the wiring state in a network.

The communication device disclosed herein is connectable by straight or crossover wiring connection to another communication device. The communication device comprises a first port configured to send or receive signals to or from the other communication device, a second port configured to receive signals when the first port is able to send signals, and configured to send signals when the first port is able to receive signals, a controller including an automatic transmission and reception switching component that determines whether or not the wiring connection is correct and automatically switches the transmission and reception of signals by the first port and the second port. The controller is configured to control communication with the other device. The communication device further comprises a wiring state notification component that outputs a state of wiring with the other communication device. The controller is further configured to (i) actuate the automatic transmission and reception switching component when communication is not established with the other communication device in a state in which the automatic transmission and reception switching component is not actuated, and (ii) through the wiring state notification component, output information that there is an error in the wiring connection when communication has been established with the other communication device as a result of the (i).

The method and device disclosed herein are effective in the detection of the wiring state in a network.

DETAILED DESCRIPTION OF THE EMBODIMENTS

Embodiments

An embodiment will be described in detail through reference to the drawings as needed. However, unnecessarily detailed description may be omitted. For example, detailed description of already known facts or redundant description of components that are substantially the same may be omitted. This is to avoid unnecessary repetition in the following description, and facilitate an understanding on the part of a person skilled in the art. It will be apparent to those skilled in the art from this disclosure that the following descriptions of the embodiments are provided for illustration only and not for the purpose of limiting the invention as defined by the appended claims and their equivalents.

The inventors have provided the appended drawings and the following description so that a person skilled in the art might understand this disclosure fully, and do not intend to thereby limit the subject of the patent claims.

Unless otherwise specified, any symbols, labels, or numbers that are the same in the description indicate the same constituent elements. Also, unless otherwise specified, constituent elements that are not essential to the present invention shall not be depicted.

An embodiment will now be described through reference to the drawings.

1-1. Configuration

Figure 1:
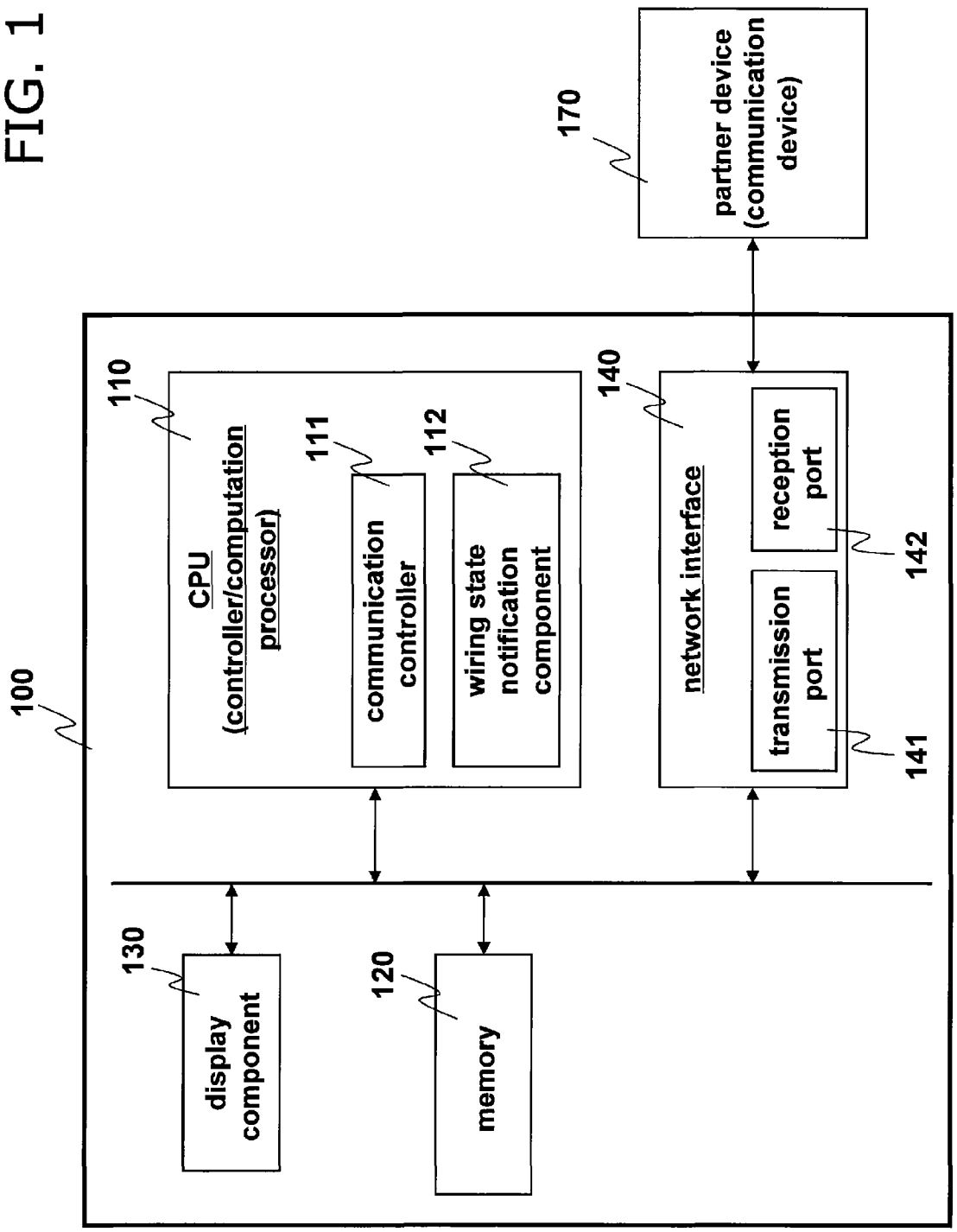
FIG. 1 is a simplified diagram of the configuration of the communication device pertaining to one embodiment.

FIG. 1 is a simplified diagram of the configuration of the communication device 100 pertaining to one embodiment. The communication device 100 is, for example, a computer equipped with a communication function and installed in an aircraft. For instance, it is a terminal or a communication device (Ethernet® device, etc.) that is connected to a LAN or other network, such as the Ethernet®. As shown in FIG. 1, the communication device 100 comprises a CPU 110 that operates as a controller or a computation processor, a memory 120, a display component 130, and a network interface 140.

The CPU 110 executes the various functions of the communication device 100 by executing specific programs. In particular, as will be discussed below, the CPU 110 executes the functions of a communication controller 111, a wiring state notification component 112, a transmission port 141 (one example of a first or second port), and a reception port 142 (one example of a first or second port), according to specific programs.

The memory 120 holds various kinds of data. For example, the memory 120 holds programs for executing the detection of the wiring state (discussed below).

The display component 130 has an LCD, an organic EL display, or another such display screen, and displays information corresponding to the wiring state detection result, as discussed below. The notification method employed by the wiring state notification component 112 may, in addition to a display or instead of a display, have an audio output component that notifies the user by using voice, sounds, or the like.

The network interface 140 has the transmission port 141 and the reception port 142, and is connected via a straight cable or crossover cable with the network interface of a partner device 170 (another communication device).

The transmission port 141 is a transmitter that sends signals such as data, commands, and responses from the communication device 100 to the partner device 170. The reception port 142 is a receiver that receives signals such as data, commands, and responses from the partner device 170.

As discussed below, the communication device 100 has a transmission and reception switching component 151 that includes an automatic switching module (one example of an automatic transmission and reception switching component) that determines whether or not the straight/crossover wiring is correct and automatically switches the transmission and reception of signals by the transmission port 141 and the reception port 142, but in its normal state, the automatic switching module (such as a device's MDI/MDI-X or auto-negotiation) is disabled.

As discussed above, the communication device 100 is connected by straight or crossover wiring to the partner device 170, and the wiring state with respect to the partner device 170 is detected by executing the functions discussed below.

1-2. Operation

FIGS. 2 to 5 are functional block diagrams of the operation of the communication device 100.

The wiring state detection function of the communication device 100 is executed by the transmission port 141 and reception port 142 that are connected via a 10/100BASE-TX cable to the partner device 170, the transmission and reception switching component 151 of the communication controller 111 that switches between the transmission port and the reception port (switches between MDI and MDI-X settings), a full-duplex/half-duplex switching component 152 (one example of a communication switching component), and the wiring state notification component 112 that notifies the user by outputting the wiring state with the partner device 170 to the display component 130.

Figure 4:
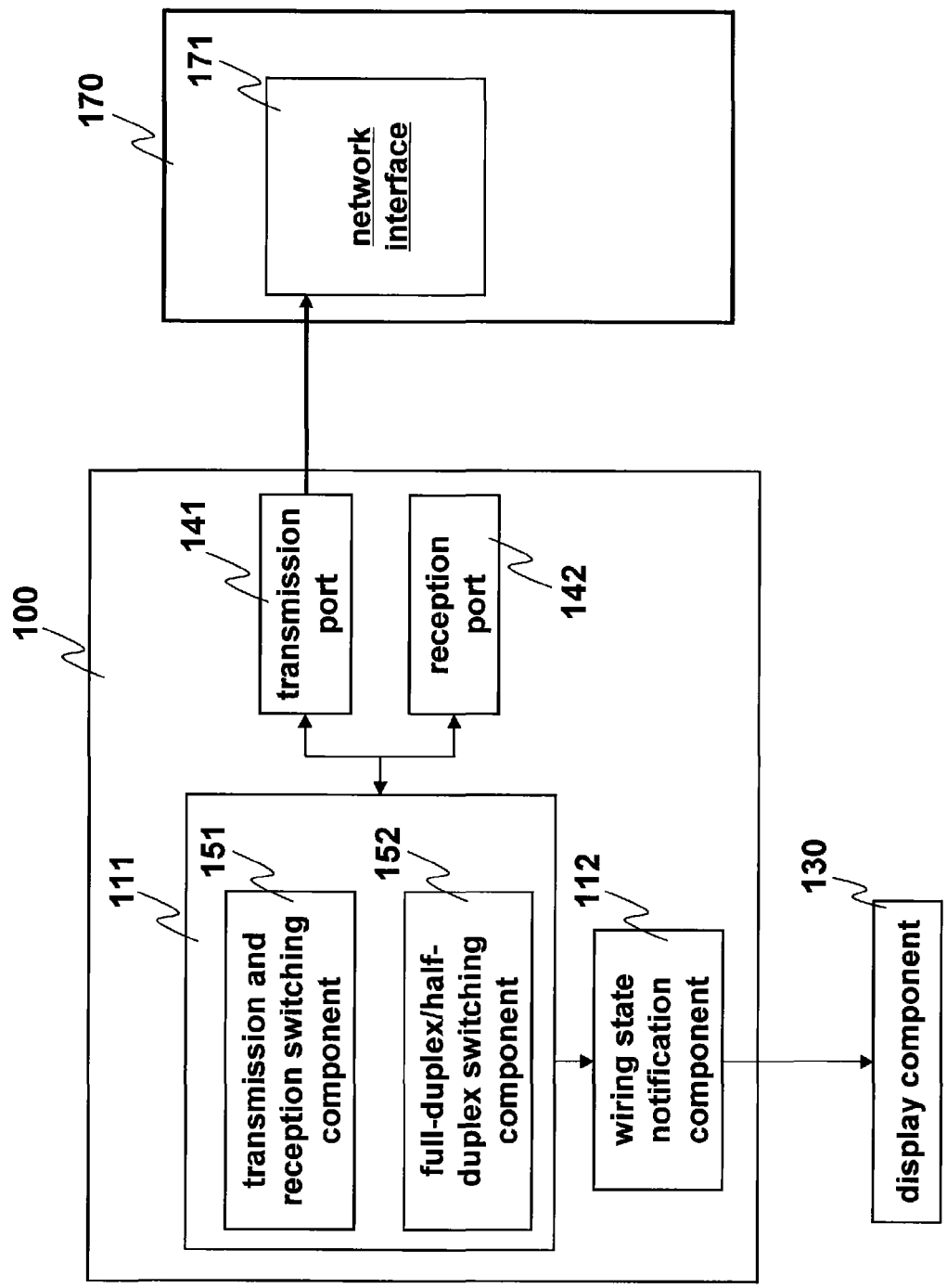
FIG. 4 is a diagram illustrating the operation of the communication device.
Figure 5:
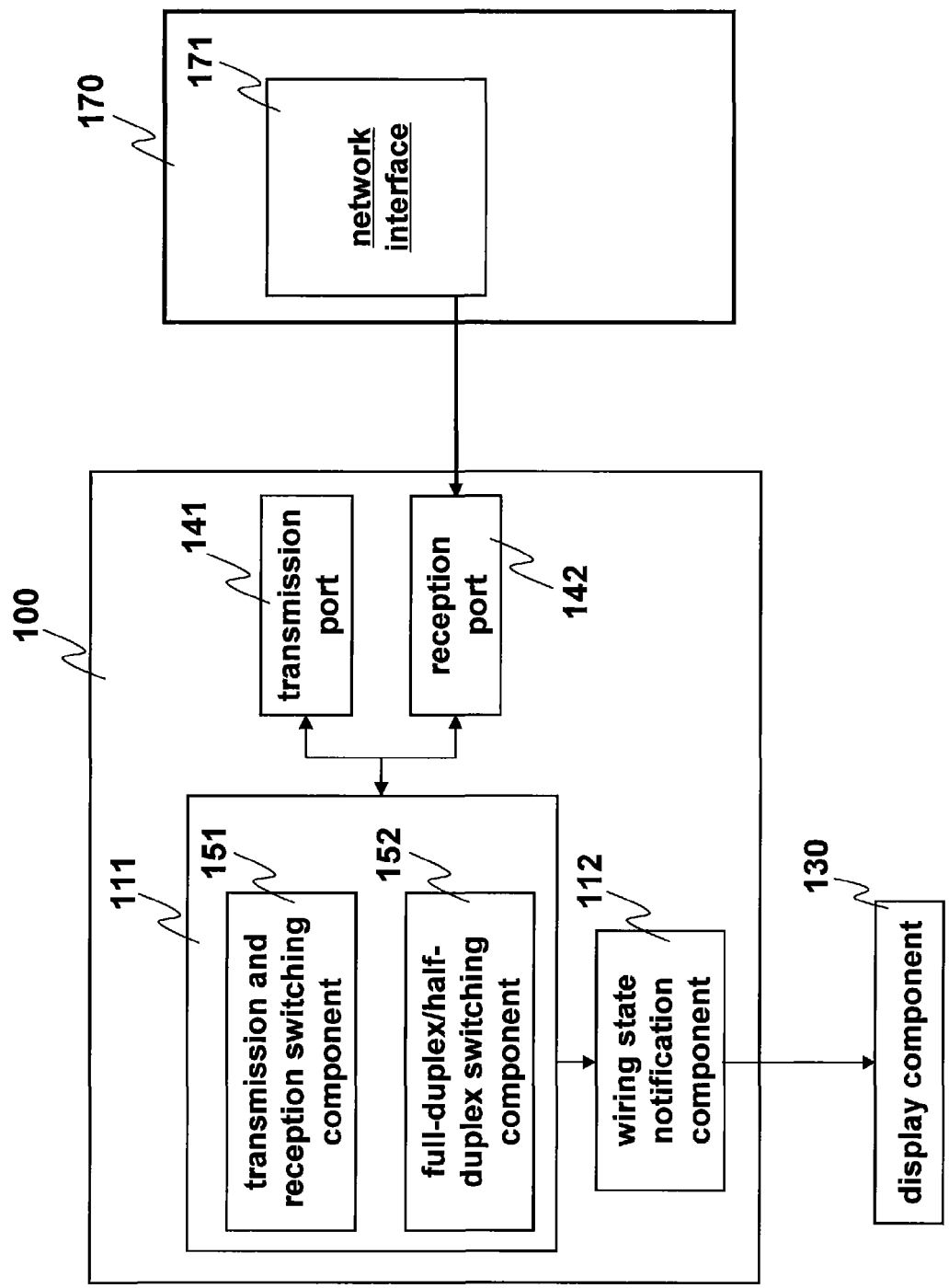
FIG. 5 is a diagram illustrating the operation of the communication device.
Figure 6:
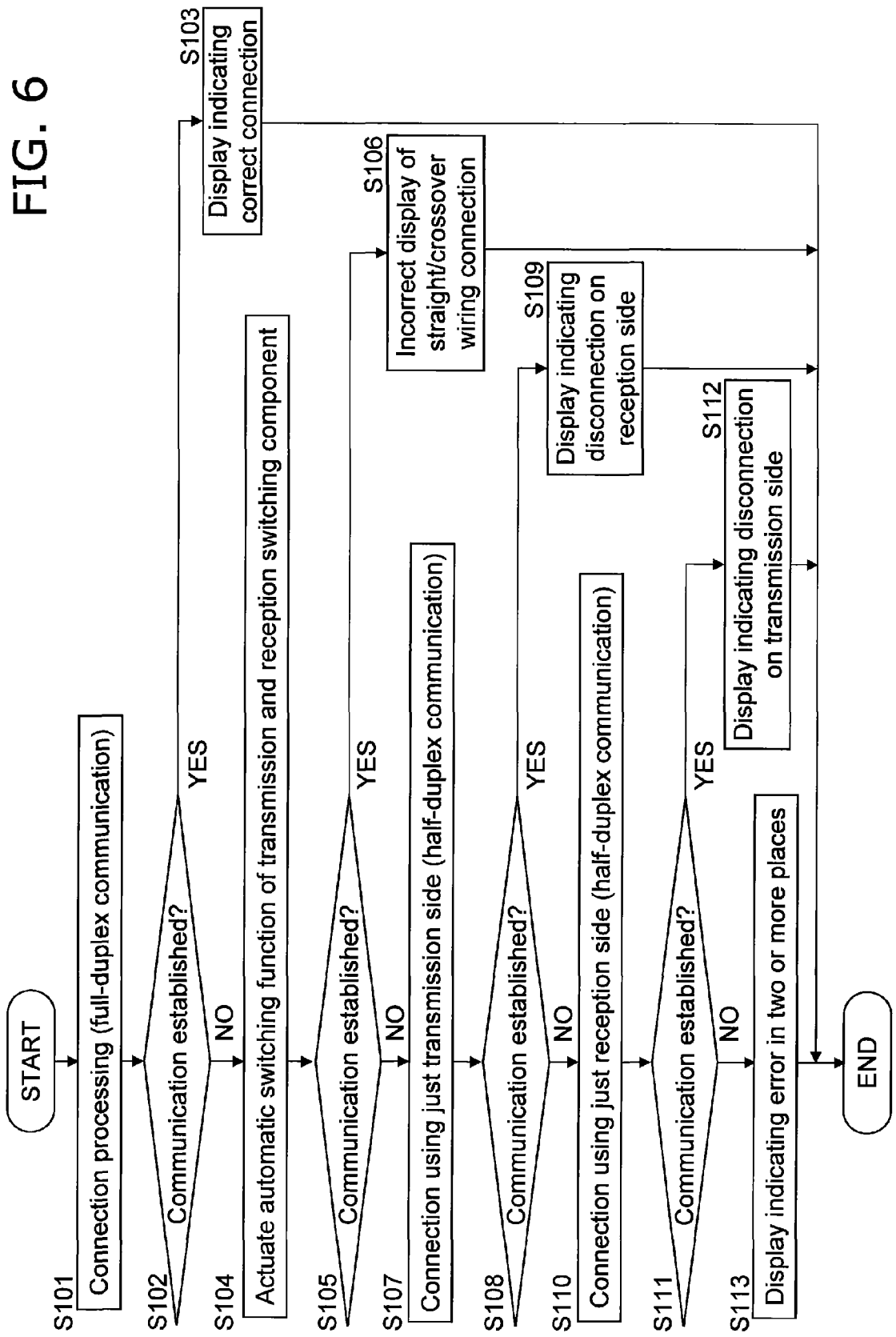
FIG. 6 is a flowchart of the operation of the communication device.

The operation for detecting the wiring state that is executed by the communication device 100 pertaining to this embodiment will be described through reference to the flowchart in FIG. 6 and the operation states of the communication device 100 shown in FIGS. 2 to 5. In the following example, we will assume that the communication device 100 is connected by straight wiring with the partner device 170.

Figure 2:
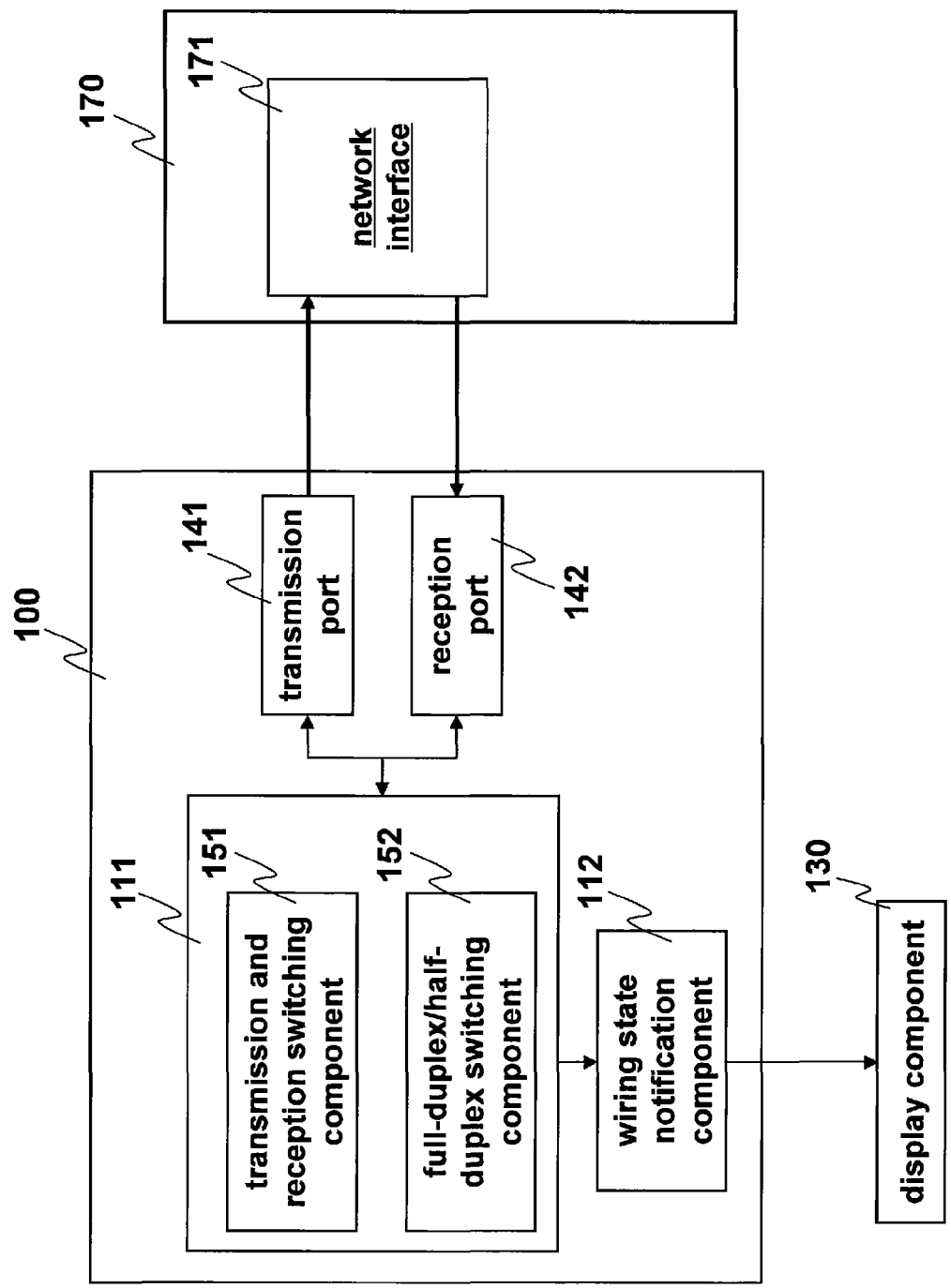
FIG. 2 is a diagram illustrating the function of the communication device pertaining to one embodiment.

Step S101: First, the communication device 100 commences connection with the partner device 170. As shown in FIG. 2, communication between the devices (in this embodiment, between the communication device 100 and the partner device 170) is commenced in a state in which the devices have been connected by a specific method.

As shown in FIG. 2, this connection is wired so that full-duplex communication is carried out, in which a signal is received from a network interface 171 of the partner device 170 by the reception port 142 of the communication device 100 simultaneously with the transmission of a signal from the transmission port 141 of the communication device 100 to the network interface 171 of the partner device 170.

Step S102: The communication controller 111 determines whether or not communication has been established with the partner device 170. If communication has been established, the flow proceeds to step S103, and if communication has not been established, the flow proceeds to step S104. If communication can be established without any problem at this point, it means that the wiring has been done properly.

Step S103: If communication has been established between the communication device 100 and the partner device 170, the wiring state notification component 112 shows a display on the display component 130 to the effect that the proper connection has been made. In this case, as shown in FIG. 2, it can be confirmed that full-duplex communication is possible between the communication device 100 and the partner device 170.

Alternatively, the user may not be notified with a display to the effect that the proper connection has been made at this point.

Figure 3:
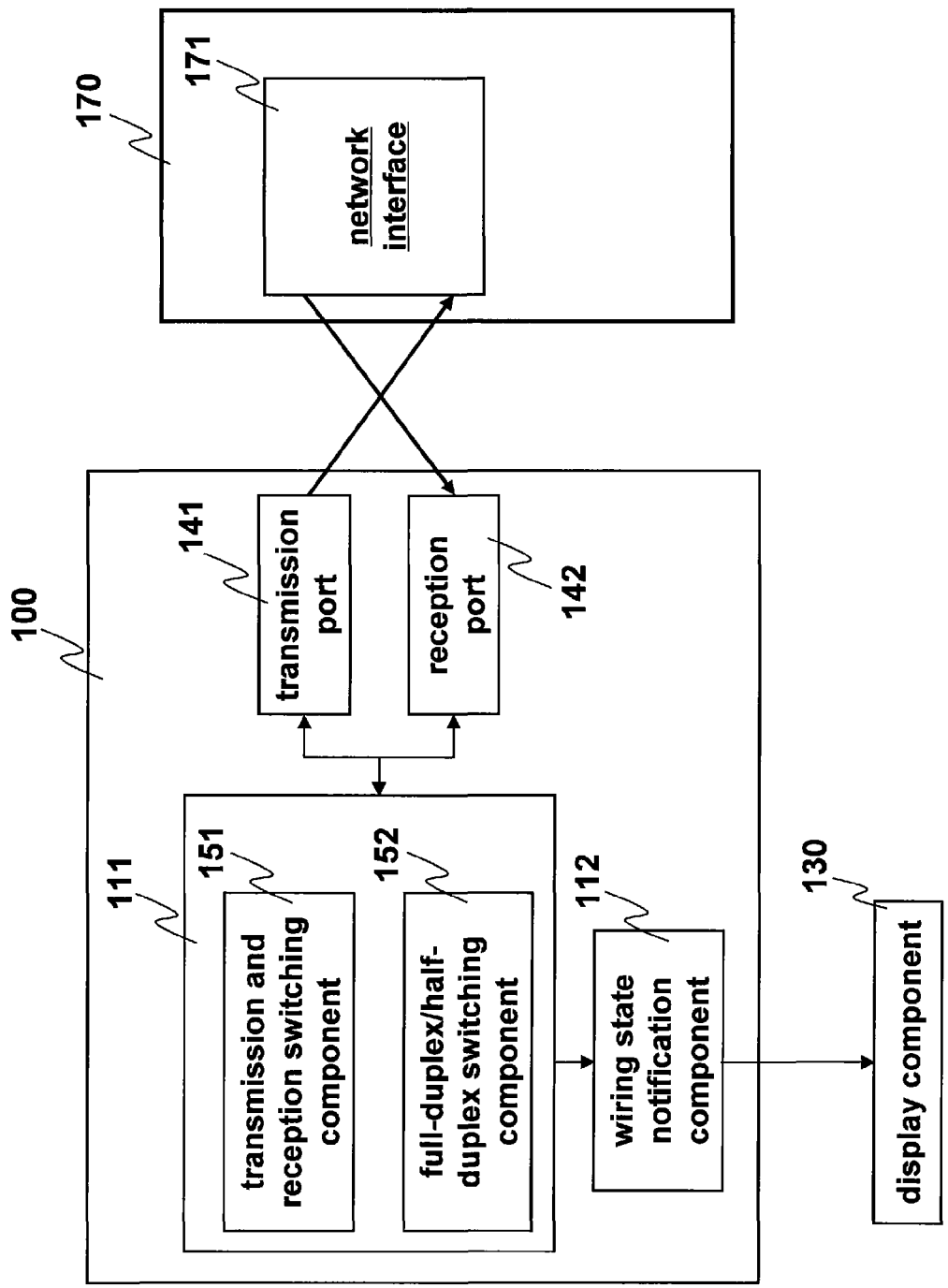
FIG. 3 is a diagram illustrating the operation of the communication device.

Step S104: If communication could not be established in step S102 (FIG. 6), the automatic switching module of the transmission and reception switching component 151 is actuated in the communication controller 111. The transmission and reception switching module determines whether or not the wiring connection of the communication device 100 is correct, and the orientation of the signal is inverted (set to crossover wiring here) at the transmission port 141 and the reception port 142 according to this determination result. FIG. 3 shows the setting of the wiring connection in step S104 (FIG. 6) when the wiring connection of the communication device 100 has been changed by the transmission and reception switching component 151.

Step S105: The communication controller 111 determines whether or not communication has been established with the partner device 170. If communication has been established, the flow proceeds to step S106, and otherwise the flow proceeds to step S107. The operation of the automatic switching module of the transmission and reception switching component 151 is stopped and its function disabled.

Step S106: If communication could be established properly when communication with the partner device 170 was attempted in step S105 (FIG. 6), it is determined that the straight or crossover wiring is inverted from what was intended. The wiring state notification component 112 then notifies the user with a display to that effect as an error message on the display component 130.

Step S107: If communication could not be established in step S105 (FIG. 6), then the full-duplex communication between the devices is first set to half-duplex communication. More specifically, the setting of the communication device 100 to MDI or MDI-X is set to MDI (straight connection), after which the full-duplex/half-duplex switching component 152 of the communication controller 111 performs half-duplex communication using only the transmission port 141 for the partner device 170 assuming that the harness on the RX side (the reception port 142 side) has a disconnection. FIG. 4 shows the connection state in step S107 (FIG. 6).

Step S108: The communication controller 111 determines whether or not communication has been established with the partner device 170. If communication has been established, the flow proceeds to step S109, and otherwise the flow proceeds to step S110.

Step S109: If communication could be established in step S108 (FIG. 6) when communication in half-duplex with the partner device 170 was attempted, it is determined that the harness on the RX side (the reception port 142 side) has a disconnection. The wiring state notification component 112 then notifies the user with a display to that effect as an error message on the display component 130.

Step S110: If communication could not be established in step S108 (FIG. 6), the setting of the communication device 100 to MDI or MDI-X is set to MDI-X (crossover connection), after which the full-duplex/half-duplex switching component 152 of the communication controller 111 performs half-duplex communication using only the reception port 142 for the partner device 170, assuming that the harness on the TX side (the transmission port 141 side) has a disconnection. FIG. 5 shows the connection state in step S110 (FIG. 6).

Step S111: The communication controller 111 determines whether or not communication has been established with the partner device 170. If communication has been established, the flow proceeds to step S112, and otherwise the flow proceeds to step S113.

Step S112: If communication could be established in step S111 (FIG. 6) when communication was attempted using the RX side (the reception port 142 side) of the communication device 100 and the partner device 170, it is determined that the harness has a disconnection on the transmission side (the transmission port 141 side) of the communication device 100. The wiring state notification component 112 then notifies the user with a display to that effect as an error message on the display component 130.

Step S113: If communication could not be established in step S111 (FIG. 6), it can be assumed that there is a mistake in the wiring at two or more places. Thus, the wiring state notification component 112 notifies the user with a display to that effect as an error message on the display component 130.

The order of the steps here is just an example, and may be changed as needed. For example, the connection processing on the transmission side by half-duplex communication in steps S107 to 109 may be switched in order with the connection processing on the reception side by half-duplex communication in steps S110 to 112.

1-3. Effect

The communication device 100 pertaining to this embodiment detects a communication problem due to a wiring mistake during the creation of the network using Ethernet®, for example, which is typified by an onboard network wiring for an aircraft-use entertainment system or the like, and notifies the user of the result of this detection. Therefore, whether or not incorrect wiring has occurred during the network wiring of an aircraft can be automatically and easily detected, the user can be alerted to this problem, and the user can quickly repair the wiring problem, all without having to provide any special device. In particular, if the wiring is wrong, the user can ascertain that the wiring is wrong, that the various devices are not malfunctioning, and whether or not there is a disconnection in the harness, which allows the user to quickly repair the wiring in response to this notification.

Other Embodiments

An embodiment was described above as an example of the technology disclosed in this application, but the technology disclosed herein is not limited to this, and can also be applied to embodiments with modifications, substitutions, additions, omissions, and so forth made as needed. Also, the various constituent elements described in the above embodiment can be combined to create new embodiments.

Examples of other embodiments will now be given.

(1)

In the above embodiment, the communication device 100 performed wiring state detection by using the functions of both the transmission and reception switching component 151 and the full-duplex/half-duplex switching component 152, but this is not the only option. If communication has not been established (steps S101 and S102 in FIG. 6), the communication device 100 may actuate the automatic switching module of the transmission and reception switching component 151, then attempt to establish communication, and end the operation once this result is detected (steps S104 to S106). Alternatively, if communication has not been established (steps S101 and S102), the communication device 100 may use the full-duplex/half-duplex switching component 152 to switch to half-duplex communication, then attempt to establish communication on the transmission side or the reception side, and only detect this result (steps S107 to S112).

(2)

The transmission and reception switching component 151 of the communication device 100 comprises an automatic switching module that determines whether or not the wiring connection is correct and automatically switches the transmission and reception of signals by the transmission port 141 and the reception port 142, but this is not the only option. The configuration may be such that just the transmission and reception of signals by the transmission port 141 and the reception port 142 is switched, without determining whether or not the wiring connection is correct. In this case, if communication could not be established in step S102 in FIG. 6, the transmission and reception switching component 151 will always switch the transmission and reception of signals by the transmission port 141 and the reception port 142 in step S104.

(3)

In the above embodiment, the communication device 100 and the partner device 170 were connected by straight wiring, but may instead be connected by crossover wiring.

(4)

The communication device 100 need not comprise the display component 130 or an audio output component. For example, information may be sent to a server or another device via a communication controller installed separately in the communication device 100.

(5)

The communication device 100 pertaining to this disclosure may be in the form of a semiconductor chip or another integrated circuit that is attached to a device. Also, the wiring state detection pertaining to this disclosure can also be accomplished as a wiring state detection method that makes use of part of the communication device 100, or as a program used by a computer to execute a wiring state detection method.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the communication device, and wiring state detection method and non-transitory computer-readable medium storing program using communication device. Accordingly, these terms, as utilized to describe the technology disclosed herein should be interpreted relative to communication device, and wiring state detection method and non-transitory computer-readable medium storing program using communication device.

The term "configured" as used herein to describe a component, section, or part of a device includes hardware and/or software that is constructed and/or programmed to carry out the desired function.

What is claimed is:

1. A communication device that is connectable by straight or crossover wiring connection to another communication device, said communication device comprising:
    a first port configured to send or receive signals to or from the other communication device;
    a second port configured to receive signals when the first port is able to send signals, and configured to send signals when the first port is able to receive signals;
    a controller including an automatic transmission and reception switching component that determines whether or not the wiring connection is correct and automatically switches the transmission and reception of signals by the first port and the second port, the controller being configured to control communication with the other device; and
    a wiring state notification component that outputs a state of wiring with the other communication device,
    wherein, the controller is further configured to:
    (i) actuate the automatic transmission and reception switching component when communication is not established with the other communication device in a state in which the automatic transmission and reception switching component is not actuated; and
    (ii) through the wiring state notification component, output information that there is an error in the wiring connection when communication has been established with the other communication device as a result of the (i),
    wherein the controller further includes a communication switching component that switches communication with the other communication device to full-duplex communication in which communication is performed using the first port and the second port, or to half-duplex communication in which communication is performed using either one of the first port or the second port, and
    the controller is further configured to:
    (iii) switch the communication switching component to the half-duplex communication in which only the first port is used when communication with the other communication device is not established as a result of the (i); and
    (iv) through the wiring state notification component, output information that there is an error in a connection with the second port when communication with the other communication device has been established as a result of the (iii).

2. The communication device according to claim 1,
    wherein the controller is further configured to:
    (v) perform communication using only the second port when communication with the other communication device is not established as a result of the (iii), and
    (vi) through the wiring state notification component, output information that there is an error in a connection with the first port when communication with the other communication device has been established as a result of the (v).

3. The communication device according to claim 2,
    wherein the controller is further configured to, through the wiring state notification component, output information that there are a plurality of errors when communication with the other communication device is not established as a result of the (v).

4. The communication device according to claim 1,
further comprising at least one of a display component configured to display information outputted by the wiring state notification component and an audio output component configured to output by voice or sounds the information outputted by the wiring state notification component.

5. The communication device according to claim 1,
wherein the controller is configured to de-actuate the automatic transmission and reception switching component after having actuated the automatic transmission and reception switching component in the (i), and
when the transmission and reception of signals by the first port and the second port has been switched by the automatic transmission and reception switching component in the (i), the controller further switches the transmission and reception of signals by the first port and the second port.

6. A communication device that is connectable by straight or crossover wiring connection to another communication device, said communication device comprising:
a first port configured to send or receive signals to or from the other communication device;
a second port configured to receive signals when the first port is able to send signals, and configured to send signals when the first port is able to receive signals;
a controller including a communication switching component that switches communication with the other communication device to full-duplex communication in which communication is performed using the first port and the second port, or to half-duplex communication in which communication is performed using either one of the first port and the second port, the controller being configured to control communication with the other device; and
a wiring state notification component that outputs a state of wiring with the other communication device,
wherein the controller is further configured to:
(i) switch the communication switching component to half-duplex communication in which only the first port is used when communication has not been established with the other communication device; and
(ii) have the wiring state notification component output information that there is an error in a connection with the second port when communication has been established with the other communication device as a result of the (i).

7. The communication device according to claim 6,
wherein the controller is further configured to:
(iii) perform communication using only the second port when communication with the other communication device is not established as a result of the (i); and
(iv) have the wiring state notification component output information that there is an error in a connection with the first port when communication with the other communication device has been established as a result of the (iii).

8. A wiring state detection method using a communication device that is connectable by straight or crossover wiring connection to another communication device, the communication device including a first port, a second port, and a communication switching component, the first port being configured to send or receive signals to or from the other communication device, the second port being configured to receive signals when the first port is able to send signals and configured to send signals when the first port is able to receive signals, and the communication switching component being configured to switch communication with the other communication device to full-duplex communication in which communication is performed using the first port and the second port, or to half-duplex communication in which communication is performed using either one of the first port and the second port,
the method including:
switching the communication switching component to half-duplex communication in which only the first port is used when communication has not been established with the other communication device; and
outputting information that there is an error in a connection with the second port when communication has been established with the other communication device as a result of switching the communication switching component to half-duplex communication.

9. A non-transitory computer-readable medium storing a program that causes a computer to execute a wiring state detection method using a communication device that is connectable by straight or crossover wiring connection to another communication device, the communication device including a first port, a second port, and a communication switching component, the first port being configured to send or receive signals to or from the other communication device, the second port being configured to receive signals when the first port is able to send signals and configured to send signals when the first port is able to receive signals, and the communication switching component being configured to switch communication with the other communication device to full-duplex communication in which communication is performed using the first port and the second port, or to half-duplex communication in which communication is performed using either one of the first port and the second port,
the method including:
switching the communication switching component to half-duplex communication in which only the first port is used when communication has not been established with the other communication device; and
outputting information that there is an error in a connection with the second port when communication has been established with the other communication device as a result of switching the communication switching component to half-duplex communication.

\* \* \* \* \*